United States Patent Office 3,726,855

Patented Apr. 10, 1973

3,726,855

CHLORINATED POLYHYDROXY POLYETHERS

Milton Lapkin, Barrington, R.I., assignor to Olin Corporation

No Drawing. Continuation-in-part of application Ser. No. 786,772, Dec. 24, 1968. This application July 6, 1970, Ser. No. 52,676

Int. Cl. C07c *47/18*

U.S. Cl. 260—209 R 2 Claims

ABSTRACT OF THE DISCLOSURE

Chlorinated polyhydroxy polyethers are prepared by reacting a sucrose- or dextrose-based material, with over 15% by weight of the total reactants employed in preparing the chlorinated polyhydroxy polyether of 4,4,4-trichloro-1,2-epoxybutane in the presence of an acid catalyst at 30–200° C. These chlorinated polyhydroxy polyethers are useful in the preparation of flame-retardant polyurethane foams.

This application is a continuation-in-part of copending application Ser. No. 786,772, filed Dec. 24, 1968, now abandoned, and abandoned application Ser. No. 563,714, filed July 7, 1966.

This invention relates to chlorinated polyhydroxy polyethers that are useful in making flame-retardant polyurethane foam and which are prepared from 4,4,4-trichloro-1,2-epoxybutane and a sucrose- or dextrose-based material, and to a process for preparing these chlorinated polyhydroxy polyethers.

Polyurethane foams have found wide and varied uses in industry. For example, the utility of flexible and semirigid foams in cushioning and furniture construction is now well-known. The rigid foams are also used to great advantage in construction, insulation and so forth.

However, the range of utility of these foams has been somewhat circumscribed by their flammability. Consequently, numerous attempts have been made to impart flame retardance to these materials. These have included incorporating a fire-retardant additive in the polyurethane foam forming reaction mixture or employing, as polyol reactants in the mixture, certain chlorinated polyols. These latter may be prepared by reacting a chlorinated alkylene oxide with certain polyhydroxy compounds, as is known in the art. See for example U.S. Pat. No. 3,402,169 which discloses polyhalogenous polyhydroxy ethers, useful in making nonflammable polymeric products, prepared by reacting a polyhalogenous alkylene oxide, such as trichloropropylene oxide, with a polyhydric alcohol initiator such as glycerol.

In this art of preparing polyhalogenated polyols, 4,4,4-trichloro-1,2-epoxybutane has been recognized to be particularly useful as an intermediate in making polyurethane foam having improved physical properties. Thus U.S. Pats. Nos. 3,244,754 and 3,269,961 disclose the use of adducts of 4,4,4-trichloro-1,2-epoxybutane and selected polyhydric alcohols in the preparation of flame-retardant polyurethane foam. While these polyols do impart a degree of flame retardance to polyurethane foam prepared therefrom, the problem of flammability in foam has not been eliminated by the use of these adducts.

It is a primary object of this invention to prepare polychlorinated polyhydroxy polyethers which are useful in making highly flame-retardant polyurethane foam.

Another object of the invention is to prepare polychlorinated polyhydroxy polyethers, using 4,4,4-trichloro-1,2-epoxybutane, which polyethers are valuable intermediates in preparing rigid polyurethane foams having superior flame retardance and improved physical properties.

Other objects of the invention will become apparent from the following detailed description.

Now it has been found in accordance with this invention that polyethers prepared from 4,4,4-trichloro-1,2-epoxybutane and a carbohydrate-based material, selected from the group consisting of a sucrose- and a dextrose-based material, confer superior flame-retardant properties on rigid polyurethane foams made therefrom. This unexpected degree of flame retardance renders the polyurethane foams of this invention useful in a wide variety of heretofore dangerous applications.

More particularly, the chlorinated polyethers of this invention are provided by reacting 4,4,4-trichloro-1,2-epoxybutane with a sucrose- or dextrose-based material in the presence of an acid reaction catalyst at a temperature between about 30° and about 200° C.

By the term "sucrose- or dextrose-based material" in the claims and specification herein is meant one of the following materials: the reaction product of sucrose and water, the oxyalkylated reaction product of sucrose and water, the reaction product of sucrose and a polyhydric alcohol, the oxyalkylated reaction product of sucrose and a polyhydric alcohol, the reaction product of dextrose and water, the oxyalkylated reaction product of dextrose and water, the reaction product of dextrose and a polyhydric alcohol, and the oxyalkylated reaction product of dextrose and a polyhydric alcohol.

Any type of sucrose or dextrose, otherwise referred to as glucose, can be employed in the preparation of the sucrose- or dextrose-based material. Thus, for example, anhydrous dextrose or a hydrated dextrose, such as d-glucose monohydrate, is suitably used.

The sucrose-based material comprising the reaction product of sucrose and water or sucrose and a polyhydric alcohol is provided by mixing sucrose with water or a polyhydric alcohol, and heating the resulting mixture at elevated temperatures, i.e., between about 25° and 150° C., in the presence of an acid catalyst.

Any polyhydric alcohol containing at least two hydroxyl groups may be employed in the preparation of the above-described sucrose-based material. It is preferred to employ glycerol, ethylene glycol, propylene glycol, sorbitol and the like due to their availability and ease of reaction. However, polyhydric alcohols which may be conveniently employed include, but are not limited to, pentaerythritol, hexanetriol, trimethylol propane, trimethylol ethane, 1,2-butanediol, diethylene glycol, triethylene glycol, 2-butene-1,4-diol, 2-butyne-1,4-diol, 3-chloro-1,2-propanediol, 2-chloro-1,3-propanediol, mixtures thereof, and the like. Preferably, at least one mol of polyhydric alcohol is employed per one mol of sucrose.

The acid catalyst employed in the preparation of the sucrose-based material can be any inorganic acid, such as hydrofluoric acid, organic acid such as acetic acid, trichloroacetic acid and succinic acid, or a Lewis acid. Representative Lewis acid catalysts include, but are not limited to, boron trifluoride etherate, boron trichloride, aluminum chloride, titanium chloride, tin tetrachloride, ferric chloride and acidic clays, such as Tonsil clay. The preferred catalyst is boron trifluoride etherate.

An oxyalkylated reaction product of sucrose and water, or sucrose and a polyhydric alcohol, can be provided by reacting the previously described reaction product of sucrose and water, or sucrose and a polyhydric alcohol, with a halogen-free epoxide prior to reaction with 4,4,4-trichloro-1,2-epoxybutane. Where a halogen-free epoxide is employed in preparing the sucrose-based material, any compound or mixture of compounds containing a 1,2-oxide can be conveniently employed. Typical of such compounds are alkylene oxides, aryl-alkyl oxides, cycloalkylene oxides, and the like. Specific reactants include, but are not limited to, ethylene oxide, propylene oxide, butylene oxide, glycidol, isobutylene oxide, n-hexyl oxide, cyclobutylene oxide, cyclohexylene oxide, mixtures thereof and the like. The preferred epoxides are the lower alkylene oxides, that is, those containing between about 2 and about 6 carbon atoms, such as ethylene oxide, propylene oxide, etc.

The aforementioned oxyalkylation reaction is carried out at a temperature between about 30° and about 200° C. in the presence of a reaction catalyst. Any of the acid catalysts described above as suitable for use in the preparation of the sucrose-based material may be conveniently employed in the oxyalkylation step. Furthermore, alkaline catalysts such as sodium hydroxide, sodium bicarbonate, sodium methylate, and the like, can also be utilized in this oxyalkylation step.

The dextrose-based materials employed in the preparation of the chlorinated polyhydroxy polyethers of this invention are prepared in the same manner as described above for the sucrose-based materials. While both sucrose-based and dextrose-based materials can be employed in the preparation of flame-retardant polyurethane foams having superior properties, preferred embodiments of this invention utilize the dextrose-based materials.

The chlorinated polyhydroxy polyethers of this invention are prepared by reacting one of the aforementioned dextrose-based or sucrose-based materials with 4,4,4-trichloro - 1,2 - epoxybutane at a temperature between about 30° and about 200° C., and preferably between about 70° and about 130° C. The reaction is carried out in the presence of an acid catalyst; any of the acid catalysts mentioned previously as suitable for use in the preparation of the sucrose-based materials can be suitably used in this oxyalkylation reaction.

The 4,4,4-trichloro-1,2-epoxybutane can be employed in purified form, as a component of a crude reaction mixture, or as a blend with a halogen-free epoxide. Any of the halogen-free epoxides listed previously as suitable for use in the preparation of the sucrose-based and dextrose-based materials can be employed as a component of such a blend.

There are two variables which are critical to the successful practice of the invention. The first critical variable is the proportion of 4,4,4-trichloro-1,2-epoxybutane used in preparing the chlorinated polyhydroxy polyethers of the invention. This proportion must be over 15% by weight, and preferably between about 40 and about 85%, based on the total weight of reactants employed. This is in order to obtain a chlorinated polyether from which polyurethane foam, having an appreciable degree of flame retardance, can be prepared. It has been found that polyurethane foam having exceptionally good flame-retardant properties is obtained using the chlorinated polyhydroxy polyethers of the invention in which the chlorine content ranges from about 25 to about 50% by weight. This range of chlorine content in the polyethers corresponds approximately to the above-specified range of 4,4,4-trichloro-1,2-epoxybutane employed in preparing the polyethers of the invention.

The second critical variable is the amount or proportion of sucrose- or dextrosed-based material employed in preparing the polyethers of the invention. It has been surprisingly found that the presence of a certain proportion of sucrose or dextrose in the polyethers of the invention is critical to the successful utility of these polyethers in preparing polyurethane foam having an appreciable degree of flame retardance. Accordingly, in preparing chlorinated polyhydroxy polyethers according to the invention, not only must the content of 4,4,4-trichloro-1,2-epoxybutane be above 15% by weight, as noted above, but also the proportion of sucrose- or dextrose-based material employed must be sufficient to provide at least 2% by weight sucrose or dextrose, based on the total weight of reactants employed in preparing the chlorinated polyhydroxy polyethers of the invention. Preferably, the proportion of sucrose- or dextrose-based material is such as to provide between about 8 and about 35% by weight of sucrose or dextrose, based on the total weight of reactants employed.

Although chlorinated polyhydroxy polyethers having a wide range of hydroxyl numbers can be prepared according to the method described herein, it is particularly preferred in the practice of the invention to prepare polyethers having a hydroxyl number ranging from about 175 to about 800, and preferably between about 250 and about 600, which polyethers are valuable intermediates in making rigid polyurethane foam. The proportion of total epoxide to sucrose- or dextrose-based material determines, as is well-known in the art, the hydroxyl number of the resulting chlorinated polyhydroxy polyether.

The chlorinated polyhydroxy polyethers of the invention are easily prepared, in accordance with the method described above, from readily available materials. Inasmuch as they are not prepared from undiluted sucrose or dextrose, their viscosity can be controlled within practically acceptable limits for purposes of relatively easy handling. They can have a sufficiently high hydroxyl number to permit blending them with a less viscous polyol to further reduce their viscosity, without reducing their hydroxyl number below the range specified above.

As discussed previously, the chlorinated polyhydroxy polyethers of this invention are particularly useful in the preparation of rigid polyurethane foams. The polyurethane foams are prepared by reacting the chlorinated polyhydroxy polyethers of the invention with an organic polyisocyanate in the presence of a reaction catalyst and a blowing agent.

Any of the widely-known organic polyisocyanates may be employed in the preparation of the polyurethane foams. This includes diisocyanates, triisocyanates, and polyisocyanates. Naturally, the organic diisocyanates are preferred due to commercial availability, especially mixtures of isomers of toluene diisocyanate which are readily available commercially. The most common isocyanate available is toluene diisocyanate, which is a mixture of about 80 percent by weight of 2,4-toluene diisocyanate and about 20 percent of the 2,6-isomer. Other typical exemplificative isocyanates include, but are not limited to, the following: methylene - bis - (4 - phenyl isocyanate); 3,3′ - bitoluene - 4,4′ - diisocyanate; 3,3′ - dimethoxy-4,4′-biphenylene diisocyanate; naphthalene - 1,5 - diisocyanate; hexamethylene diisocyanate; 1,4-phenylene diisocyanate; polyphenylene polymethylene isocyanate; etc. The amount of isocyanate employed in the preparation of the polyurethane foams should be sufficient to provide at least 0.7 NCO group per hydroxyl group present in the reaction system. An excess of isocyanate compound may be conveniently employed; however, this is generally undesirable due to the high cost of the isocyanate compounds. It is preferable, therefore, to employ no greater than about 1.5 NCO groups per hydroxyl group and preferably between about 0.9 and 1.1 NCO groups per hydroxyl group.

The foaming agent employed may be any of those known to be useful for this purpose, such as water, the halogenated hydrocarbons, and mixtures thereof. Typical halogenated hydrocarbons include, but are not limited to the following: monofluorotrichloromethane, difluorodichloromethane, 1,1,2-trichloro - 1,2,2 - trifluoroethane, methylene chloride, chloroform, and carbon tetrachloride. The amount of foaming agent employed may be varied within a wide range. Generally, however, the halogenated hydrocarbons are employed in an amount from 1 to 50 parts by weight per 100 parts weight of the chlorinated polyhydroxy polyether of the present invention, and water can be employed in an amount of from 0.1 to 10 parts by weight per 100 parts by weight of chlorinated polyhydroxy polyether of the present invention.

Any of the catalysts known to be useful in the preparation of polyurethane foams can be employed including tertiary amines, metallic salts, and mixtures thereof. Typical tertiary amines include, but are not limited to, the following: N-methyl morpholine, N-hydroxyethyl morpholine, triethylene diamine, triethylamine and trimethylamine. Typical metallic salts include for example, the salts of antimony, tin and iron, e.g., dibutyltin dilaurate, stannous octoate, etc. Generally speaking, the catalyst is employed in an amount from 0.1 to 2.0 percent by weight based on the weight of the polyether.

It is preferred in the preparation of the polyurethane foams to employ minor amounts of a surfactant in order to improve the cell structure of the polyurethane foam. Typical of such surfactants are the silicone oils and the siloxane-oxyalkylene block copolymers. Generally, up to 2 parts by weight of the surfactant is employed per 100 parts of polyether.

Various additives can be employed which serve to provide different properties, e.g., fillers, such as clay, calcium sulfate, or ammonium phosphate may be added to lower cost and improve physical properties. Ingredients such as dyes may be added for color, and fibrous glass, asbestos, or synthetic fibers may be added for strength. Furthermore, plasticizers, deodorants and anti-oxidants may be added.

Polyurethane foams prepared from the chlorinated polyhydroxy polyethers of this invention are characterized by remarkable flame-retardant properties. Thus, these polyurethane foams pass the SPI Proposed Tentative Test Method For Flame Penetration Test, a severe test requiring direct contact of the polyurethane foam with a propane flame having a temperature between 1910° and 1960° F. Furthermore, these polyurethane foams have low fire hazard classification when tested in accordance with the Underwriters Laboratories Test UL723, 3rd ed. The flame-retardant properties of these foams make them particularly valuable for use in building applications where flame retardance is a critical factor.

In addition to flame retardance, the polyurethane foams have other highly desirable properties. For example, they have excellent moisture vapor transmission and humid aging properties which enhance their attractiveness in a variety of commercial applications.

The following examples will serve to illustrate the practice of this invention; all parts and percentages are by weight unless otherwise specified. Where crude 4,4,4-trichloro-1,2-epoxybutane is indicated in the examples, this is a mixture comprising approximately 75 percent by weight 4,4,4-trichloro-1,2-epoxybutane, 3 percent by weight tetrachlorobutanol, 2 percent by weight dichloroepoxybutane, with the balance comprised of high boiling by-products of the dehydrohalogenation of tetrachlorobutanol.

EXAMPLE 1

Boron trifluoride etherate (1.1 parts) and water (100 parts) were charged to a reactor containing 342 parts of sucrose. Heat was applied and the temperature of the mixture increased to 70° C. Ethylene oxide (140 parts) was added while maintaining a temperature of 50°–70° C. The volatiles were stripped at 70° C. and 3 mm. of mercury pressure. The temperature was increased to 80° C. and additional boron trifluoride etherate (2.3 parts) and 4,4,4-trichloro-1,2-epoxybutane (1,845 parts) added, while maintaining a temperature between 70°–80° C. The resulting polyol had a pH of 4.6, an acid number of 0.5 mg. KOH/gm., and a hydroxyl number of 193 mg. KOH/gm.

EXAMPLE 2

Boron trifluoride etherate (1.1 parts) and water (100 parts) were charged to a reactor containing 342 parts of sucrose. Heat was applied and the temperature of the mixture increased to 70° C. Ethylene oxide (110 parts) was added while maintaining a temperature of 50°–70° C. The volatiles, mainly water, were stripped at 75°–80° C. and 3 mm. of mercury pressure. Boron trifluoride etherate (2.3 parts) and 4,4,4-tricholoro-1,2-epoxybutane (1,147 parts) were added to the reaction mixture while maintaining a temperature of 80° C. The resulting polyol had a hydroxyl number of 279 mg. KOH/gm. and a viscosity of 2,000,000 at 29° C.

To 100 parts of the above polyol was added 1.5 parts of N,N,N',N'-tetramethylbutanediamine, 1.5 parts of a siloxane-oxyalkylene block copolymer surfactant and 26 parts of trichlorofluoro-methane. The mixture was stirred until homogeneous. Then 75 parts of polyphenylene polymethylene isocyanate were added. After stirring, the mixture was poured into a rectangular box. Creaming of the mixture was observed after 18 seconds. After 121 seconds, the foam began to rise, and a tack-free foam was obtained after 111 seconds. The foam had excellent physical properties as set forth in Table II below.

EXAMPLE 3

Glycerol (92 parts) was charged to a reactor containing 342 parts of sucrose. Heat was applied and the temperature of the mixture increased to 150° C. After the mixture became homogeneous, boron trifluoride etherate (2.3 parts) was added. Then a blend of propylene oxide (392 parts) and 4,4,4-trichloro-1,2-epoxybutane (1,185 parts) was added, while maintaining a temperature of 80°–90° C. The volatiles were stripped at 90° C. and less than 10 mm. of mercury pressure. The following properties of the resulting polyol were determined:

Hydroxyl No.: 344 mg. KOH/gm.
Acid No.: 1.5 mg. KOH/gm.
Viscosity: 73,000 cps. at 25° C.

A foam was prepared from this polyol with the reactants and in the proportions listed in Table I below. Its properties are listed in Table II below.

EXAMPLE 4

Boron trifluoride etherate (1.1 parts) was added to 822 parts of product from Example 3, followed by the addition of 4,4,4-trichloro-1,2-epoxybutane (152 parts), while maintaining a temperature of 70°–90° C. The volatiles were stripped at 80°–90° C. and less than 10 mm. of mercury pressure. The following properties of the resulting polyol were determined:

Hydroxyl No.: 289 mg. KOH/gm.
Acid No.: 1.8 mg. KOH/gm.
Viscosity: 179,625 cps. at 25° C.

The composition of the foam prepared from this polyol is set forth in Table I. Its properties are listed in Table II.

EXAMPLES 5–8

Following the procedure of Example 2, ethylene oxide (110 parts) was reacted with sucrose (342 parts) in a water (100 parts) solution containing boron trifluoride etherate (2.3 parts). The volatiles were stripped at 75°–80° C. and 8 mm. of mercury pressure. Additional boron trifluoride etherate (2.3 parts) was charged to the reactor. The resulting composition was divided into Portions A, B, C and D which were employed as starting materials in Examples 5–8, respectively.

In Example 5, Portion A (550 parts) was reacted with a blend of 494 parts propylene oxide and 494 parts 4,4,4-trichloro-1,2-epoxybutane, while maintaining a reaction mixture temperature of 70°–90° C. The volatiles were stripped at 80°–90° C. and less than 10 mm. of mercury pressure. The resulting polyol had a hydroxyl number of 374 mg. KOH/gm. and a viscosity of 46,000 cps. at 25° C.

A foam was prepared employing this polyol with the reactants and in the proportions listed in Table I. The properties of the foam are set forth in Table II.

In Example 6, 325 parts of propylene oxide were added to Portion B (370 parts) while maintaining a temperature of 70°–90° C. After the addition was completed, 327 parts of 4,4,4-trichloro-1,2-epoxybutane were added. The volatiles were stripped at 80°–90° C. and less than 10 mm. of mercury pressure. The resulting polyol had a hydroxyl number of 374 mg. KOH/gm. and a viscosity of 71,600 cps. at 25° C.

The data for the foam prepared from this polyol is set forth in Tables I and II below.

In Example 7, Portion C (370 parts) was reacted with 325 parts of 4,4,4-trichloro-1,2-epoxybutane, while maintaining a temperature of 70°–90° C. After the addition was completed, 324 parts of propylene oxide were added. The volatiles were stripped at 80°–90° C. and less than 10 mm. of mercury pressure. The resulting polyol had a hydroxyl number of 389 mg. KOH/gm. and a viscosity of 96,000 cps. at 25° C.

The data for the foam prepared from this polyol is set forth in Tables I and II below.

In Example 8, 183 parts of ethylene oxide were added to Portion D (406 parts) while maintaining a temperature of 70°–90° C. After the addition was completed, a blend of 179 parts propylene oxide and 359 parts of 4,4,4-trichloro-1,2-epoxybutane oxide was added. The volatiles were stripped at 80°–90° C. and less than 10 mm. of mercury pressure. The resulting polyol had a hydroxyl number of 380 mg. KOH/gm. and a viscosity of 39,000 cps. at 25° C.

The data for the foam prepared from this polyol is listed in Tables I and II.

EXAMPLE 9

Boron trifluoride etherate (1.1 parts) and water (100 parts) were charged to a reactor containing 342 parts of sucrose. Heat was applied and the temperature of the mixture increased to 70° C. Ethylene oxide (110 parts) was added while maintaining a temperature of 50°–70° C. The volatiles, mainly water, were stripped at 75°–80° C. and 3 mm. of mercury pressure. Boron trifluoride etherate (2.3 parts) and a blend of 50 parts propylene oxide, 50 parts 4,4,4-trichloro-1,2-epoxybutane were added to the reaction mixture while maintaining a temperature between 70°–80° C. After the addition was completed, the volatiles were stripped at 90° C. under one mm. of mercury pressure. The polyol had the following properties:

Hydroxyl No.: 320 mg. KOH/gm.
Acid No.: 1.5 mg. KOH/gm.
Viscosity: 35,400 cps. at 25° C.
pH: 3.4.

The data for the preparation of a foam using this polyol is set forth in Table I below; the properties of the foam are listed in Table II.

TABLE II.—PHYSICAL DATA FOR FOAMS

| Example No. | Density, lbs./cu. ft. | Compressive strength, lbs./sq. in. — Parallel | Compressive strength, lbs./sq. in. — Perpendicular | Flame test | Ignition test time [2] (+avg. for 2 samples) |
|---|---|---|---|---|---|
| 2 | 2.19 | 40.1 | 16.4 | 10 NB 1.0 [1] | +30:00 |
| 3 | 2.09 | 38.1 | 18.9 | NB | +24:34 |
| 4 | 2.00 | 32.7 | 19.9 | NB | +14:56 |
| 5 | 2.01 | 36.1 | 13.5 | NB | +50:51 |
| 6 | 2.10 | 35.6 | 12.9 | NB | +33:07 |
| 7 | 2.10 | 33.3 | 14.1 | NB | +22:35 |
| 8 | 2.07 | 34.6 | 15.5 | NB | +17:36 |
| 9 | 2.33 | 37.2 | 15.8 | NB | +116:00 |

[1] NB means "non-burning" as determined by ASTM D-1692-59 T. The number preceding NB is the number of samples that did not burn; the number following NB is the average extent in inches of burning before self-extinguishing. If this number is 1.0 or less, the sample is "non-burning."

[2] SPI (Society of the Plastics Industry) Proposed Tentative Test Method for Flame Penetration Test, Draft 2. Briefly, specimens of foam are cut to a prescribed size, mounted in a Transiste holder with a backing of very rapid filter paper, and subjected to direct contact with a propane flame of specified length and having a temperature between 1910° to 1960° F. The average time in minutes and seconds, for the filter paper to become ignited is reported as the measure of flame resistance of the foam.

EXAMPLE 10

Boron trifluoride etherate (2.5 cc.) and ethylene glycol (one mol; 62 parts) were charged to a reactor containing 198 parts (one mol) of dextrose (d-glucose monohydrate). Heat was applied and the temperature of the mixture increased to 70° C. Crude 4,4,4-trichloro-1,2-epoxybutane (940 parts) was added to the reaction mixture while maintaining a temperature of 70° C. A polyol having a hydroxyl number of 360 mg. KOH/gm. was obtained.

A conventional, low-pressure 4-stream foam machine capable of pouring foam formulations was provided with the ingredients listed below and the feed rate adjusted to provide a foam formulation in the following proportions:

| Ingredients: | Parts by weight |
|---|---|
| Polyether polyol | 100.0 |
| Trichloromonofluoromethane | 30.0 |
| Silicone surfactant DC–193* | 2.0 |
| Tetramethylbutanediamine | 1.5 |
| Polyphenylene polymethylene Isocyanate (105 Index) | 88.3 |

*This silicone surfactant has the general formula set forth in Table I.

The reaction mixture was dispensed from the foaming machine into a square box having side dimensions of 8′ x 2′ and a height of 1½′ and allowed to rise and cure to provide a rigid polyurethane foam. A cream time of 14 seconds, a rise time of 129 seconds, and a tack-free time of 95 seconds were observed.

TABLE I.—FOAMING DATA

| Example No. | Polyether | Siloxane oxyalkylene block copolymer surfactant [1] | N,N,N′,N′-tetramethylbutanediamine | Trichlorofluoromethane | Polyphenylene polymethylene isocyanate | Cream time, sec. | Rise time, sec. | Tack time, sec. |
|---|---|---|---|---|---|---|---|---|
| | Ingredients used in foam, in parts by weight | | | | | | | |
| 2 | 100 | 1.5 | 1.5 | 26 | 75 | 18 | 121 | 111 |
| 3 | 100 | 2 | 2 | 29 | 87 | 17 | 120 | 118 |
| 4 | 100 | 2 | 2 | 29 | 91 | 20 | 165 | 195 |
| 5 | 100 | 2 | 2 | 29 | 94 | 22 | 111 | 135 |
| 6 | 100 | 2 | 2 | 29 | 94 | 19 | 130 | 141 |
| 7 | 100 | 2 | 2 | 29 | 98 | 19 | 90 | 84 |
| 8 | 100 | 2 | 2 | 29 | 96 | 16 | 60 | 60 |
| 9 | 300 | 6.0 | 4.8 | 89 | 240 | 23 | 200 | 215 |

[1] The surfactant employed in these formulations has the general formula:

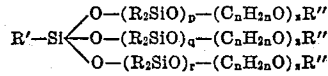

wherein R, R′ and R″ are $C_{1-8}$ alkyl radicals; *p*, *q* and *r* are each 2 to 15 and $—C_2H_{2n}O)_z—$ is a polyoxyalkylene block which is preferably a polyoxyethylene-polyoxypropylene block containing from 10 to 50 of each oxyalkylene unit.

A sample of the polyurethane foam was tested for fire hazard classification according to Underwriter's Laboratories, Inc. Test UL723, 3rd edition. The foam gave a maximum flame spread of 9½ feet, resulting in a rating of 25.

EXAMPLE 11

The procedure of Example 10 was followed to provide a polyether polyol which was then reacted exactly as described in Example 10 to provide a polyurethane foam with the exception that methylene-bis-(4-phenyl isocyanate) having an equivalent weight of 134 was employed instead of polyphenylene polymethylene isocyanate. The foaming conditions were as follows: cream time—17 seconds; rise time—124 seconds, and tack-free time—92 seconds. When tested for fire hazard classification as described in Example 10, the polyurethane foam had a maximum flame spread of 9½ feet, corresponding to a rating of 25.

EXAMPLE 12

A polyhydroxy polyether was prepared following the procedure of Example 10, with the exception that 4 mols (248 parts) of ethylene glycol were employed. In the preparation of this polyol, 1,746 gms. of crude 4,4,4-trichloro-1,2-epoxybutane were employed; the polyol had a hydroxyl number of 356 mg. KOH/gm. and a chlorine content of 48.5 percent by weight.

EXAMPLE 13

The process of Example 10 was repeated employing one mol of an anhydrous dextrose (180 gm.) and one mol of propylene glycol as the initiator. A total of 834 gms., of crude 4,4,4-trichloro-1,2-epoxybutane was added; a polyol having a hydroxyl number of 347 mg. KOH/gm. and a chlorine content of 46.5 percent by weight was obtained.

EXAMPLE 14

Boron trifluoride etherate (1.0 cc.) and water (50 cc.) were charged to a reactor containing 198 parts of dextrose (d-glucose monohydrate; one mol). Heat was applied and the temperature of the mixture increased to 70° C. Ethylene oxide (1.25 mols) was added; the addition reaction was exothermic. The reaction mixture was then post-reacted at 65° C. for ½ hour, and the volatiles were stripped at 70°–80° C./5 mm. Hg for 1.5 hours. Boron trifluoride etherate (2.0 cc.) was charged to the reaction mixture and crude 4,4,4-trichloro-1,2-epoxybutane (673 parts) was added while maintaining a temperature between 75°–85° C. After the addition was completed, the volatiles were stripped at 90° C./1 mm. Hg to provide a polyol having a hydroxyl number of 271 and a chlorine content of 46.5 percent.

EXAMPLE 15

Following the procedure of the previous examples, one mol (198 parts) of dextrose (d-glucose monohydrate) was added to a mixture of ethylene glycol (one mol, 62 parts) and 3 cc. of boron trifluoride etherate.

The reaction mixture was oxyalkylated with a mixture of 648 parts of crude 4,4,4-trichloro-1,2-epoxybutane and 260 parts of propylene oxide. After an additional hour of post-reaction at 90° C., the reaction mixture was neutralized with sodium hydroxide and the volatiles separated at 75°–80° C./6 mm. Hg. The polyol had a hydroxyl number of 420 and a chlorine content of 35 percent by weight.

What is claimed is:

1. A chlorinated polyhydroxy polyether having a hydroxyl number of about 175–800 and prepared by reacting, at a temperature of about 30–200° C. and in the presence of an acid catalyst (a) 4,4,4-trichloro-1,2-epoxybutane, in a proportion which is greater than about 15 percent based on the total weight of reactants employed in preparing said polyether, with (b) a dextrose-based material selected from the group consisting of the reaction product of dextrose and a polyhydric alcohol and the oxyalkylated reaction product of dextrose and a polyhydric alcohol wherein the oxyalkylating agent has about 2–6 carbon atoms, said polyhydric alcohol being selected from the group consisting of glycerol, ethylene glycol, propylene glycol, soribtol, pentaerythritol, hexanetriol, trimethylol propane, trimethylol ethane, 1,2-butanediol, diethylene glycol, triethylene glycol, 2-butene-1,4-diol, 2-butyene-1,4-diol, 3-chloro-1,2-propanediol, 2-chloro-1,3-propanediol, and mixtures thereof, the proportion of said dextrose-based material being such as to provide at least about 2 percent of dextrose based on the total weight of reactants employed in preparing said polyether.

2. A chlorinated polyhydroxy polyether as claimed in claim 1 having a hydroxyl number of about 250–600, a chlorine content of about 25–50 percent by weight and prepared by reacting said 4,4,4-trichloro-1,2-epoxybutane with the reaction product of dextrose and ethylene glycol.

References Cited

UNITED STATES PATENTS

| | | | |
|---|---|---|---|
| 2,956,963 | 10/1960 | Baird | 260—209 R |
| 3,260,687 | 7/1966 | Postol | 260—209 R |
| 3,350,389 | 10/1967 | Patton, Jr. et al. | 260—209 R |
| 3,402,169 | 9/1968 | Jackson | 260—209 R |

LEWIS GOTTS, Primary Examiner
J. R. BROWN, Assistant Examiner

U.S. Cl. X.R.

260—2.5 R